Aug. 18, 1953   W. J. FEDORCHAK   2,649,500
INSPECTING APPARATUS

Filed Dec. 16, 1949   2 Sheets-Sheet 1

Inventor
W. J. FEDORCHAK

By Rule and Hoge.
Attorneys

Aug. 18, 1953 W. J. FEDORCHAK 2,649,500
INSPECTING APPARATUS
Filed Dec. 16, 1949 2 Sheets-Sheet 2

Inventor
W. J. FEDORCHAK
By Rule and Hoge,
Attorneys

Patented Aug. 18, 1953

2,649,500

UNITED STATES PATENT OFFICE 2,649,500

INSPECTING APPARATUS

William J. Fedorchak, Granite City, Ill., assignor to Owens-Illinois Glass Company, a corporation of Ohio Application December 16, 1949, Serial No. 133,415

5 Claims. (Cl. 178—6.8)

My invention relates to methods and apparatus for inspecting the inner wall surfaces of containers such as bottles and jars for detecting flaws at said inner surfaces.

The invention is of special value and utility for inspecting glass containers such as are used for food products and other commodities, but is also of utility for inspecting containers made of ceramics and other materials. The term "flaws" as herein used, comprises "spikes" or sharp projections, jagged or rough surface portions and surface defects generally, and also separate fragments or particles of glass or the like which may be adhered to the inner wall surfaces of the container.

The invention provides a method and apparatus designed for instantaneous inspection of each article, permitting a continuous supply of the articles to pass through the testing station and to be inspected in rapid succession.

The invention in its preferred form is designed for inspecting glass jars and is herein shown and described as designed and used for such purpose, although not limited to this particular use.

The invention provides means for flooding the interior of a glass jar or the like with light or radiation which is outside of or extends beyond the visible spectrum. Preferably ultra-violet radiation to which the glass article is opaque is employed. An image of the inner surface of the container is produced on a mosaic screen, sensitive to such radiation, by reflection of the radiation from the said inner surface, the reflected radiation passing through a photographic lens which focuses the image on the screen. The image is scanned by a cathode ray supplied by a cathode ray tube, for example, an Iconoscope. The screen is scanned spirally by the ray or electron beam and the light densities are measured linearly in relation to the time. That is to say, if there is a light density change existing on the mosaic screen due to a flaw such as a spike or fragment of glass, the electron beam in its spiral sweep produces a sudden change in the output voltage in the circuit of said beam. This change in voltage or electrical impulse is amplified and made to operate a trigger circuit for any desired signalling or other device. In practice, closing of the trigger circuit is used to set a reject mechanism or device which is operated to segregate each defective article from those which pass the test when such defective article reaches a predetermined point in its travel beyond the testing station.

This application discloses subject matter also disclosed in my copending applications Serial No. 133,414, filed December 16, 1949, Inspecting Interior Surfaces of Glass Containers, and Serial No. 140,240, filed January 24, 1950, Electronic Inspection of Glass Containers.

Referring to the accompanying drawings which illustrate a preferred embodiment of my invention:

Figure 1:
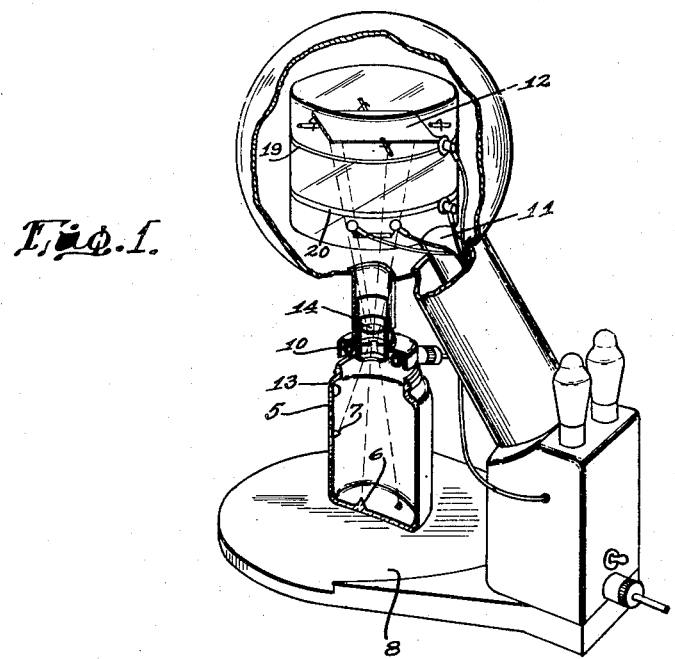
Fig. 1 is a perspective view of the apparatus, parts being shown in section and parts broken away.
Figure 2:
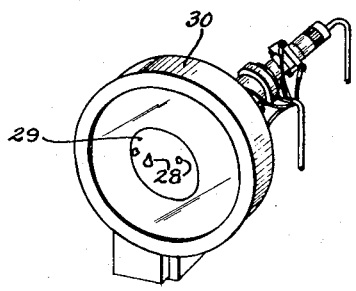
Fig. 2 is a perspective view of a picture tube by which the image on the screen is reproduced.

Referring to Fig. 1, the article to be inspected is shown as a glass jar 5 having inner surface flaws such as a spike 6 and fragments 7 of glass adhered to the inner wall surface 13. For inspection the jar is supported in upright position on a base 8. A lamp 10 or source of radiant energy is mounted directly over the open mouth of the jar, the lamp bulb being annular or doughnut shaped, designed and arranged to flood the interior of the jar with light or ultra-violet radiation. The term "light" as herein applied to radiation from the lamp 10, includes ultra-violet radiation or radiation outside of the visible spectrum.

Figure 3:
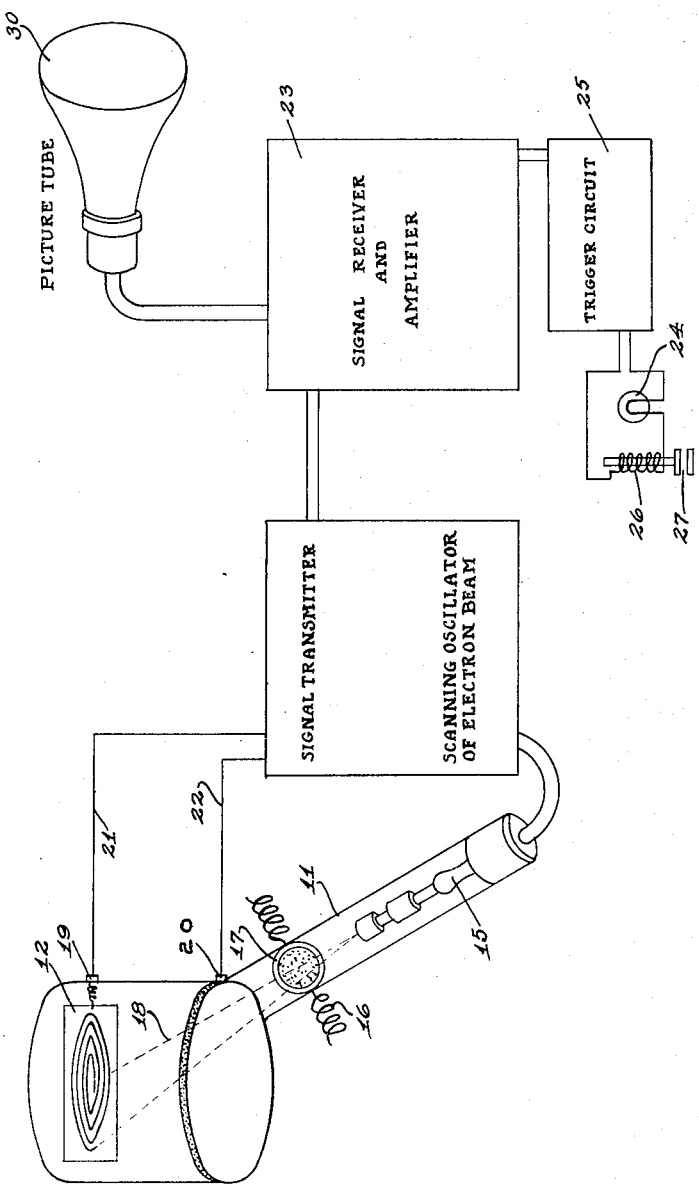
Fig. 3 is a diagrammatic view of the apparatus.

A cathode ray tube 11 such as an Iconoscope, is mounted on the base 8 and comprises a mosaic screen 12 sensitive to radiation from the lamp 10 and positioned directly over the container 5. Light from the lamp 10 is reflected from the inner surface 13 of the jar and is directed upwardly through a photographic focusing lens or lenses 14 and thereby produces an image of said surface 13 on the screen 12. The tube 11 (see Fig. 3) includes an electron gun 15. Deflecting coils 16 and 17 arranged at right angles in a conventional manner, deflect the electron beam 18, said coils operating in alternation and timed to cause the electron beam to move in a spiral path and scan the image on the screen.

When the image of a flaw such as the spike 6 or a particle 7 of glass adhered to the wall surface, is brought into the path of the beam 18, there is a sudden change in the output voltage. The circuit of the cathode ray 18 includes the collector rings 19 and 20 and wires 21, 22 leading to the signal transmitter. The signal is transmitted to the signal receiver 23 and amplified. The amplified signal is fed to a gas filled tube 25 or Thyratron. A signal lamp 24 may be connected in the trigger circuit so that the lamp is lighted when the tube is fired.

A coil 26 in the trigger circuit operates a relay switch 27 used to control an ejector mechanism which may be set by the closing of the switch and operates automatically, when the defective article reaches a predetermined point in its travel, to eject said article or segregate it from the line of articles which have passed the test.

A picture tube 30 which may be of conventional construction and operated in a well-known manner in accordance with the principles of television operation, is employed to supply an image 29 or picture which is a reproduction of that on the screen 12. Flaws in the surface of the glass appear in the picture as shown at 28. The picture tube is fed from the signal receiver and amplifier. It is used for indicating the operation of the Iconoscope 11 and also enables the operator to make any required adjustments for focusing the image on the screen 12.

Modifications may be resorted to within the spirit and scope of my invention.

I claim:

1. Apparatus for testing the inner surface of an open-mouth container for surface defects, said apparatus comprising a support for the container, a source of radiation comprising a lamp having an annular bulb providing a passageway for reflecting radiation, means for supporting said bulb adjacent to and substantially concentric with the open mouth of a container supported in upright position on said support and thereby flooding the interior surface of the container with said radiation, a mosaic screen, a photographic lens, means for supporting said lens and screen in register with said lamp bulb and in position to cause radiation reflected from said surface to be projected through the said passageway and produce an image of said surface on the screen, a cathode ray tube, scanning means for causing the cathode ray supplied by said tube to scan said image, and means for amplifying an impulse produced in the circuit of said cathode ray when the image of a defect in said surface is brought into the path of said ray.

2. The apparatus defined in claim 1, said radiation being of a wave length to which the walls of the container when made of glass are opaque, whereby transmission of the radiation through said walls is prevented, thereby preventing false signals.

3. Apparatus for testing the inner surface of an open-mouthed glass container, said apparatus comprising a support for the container, a source of radiation comprising an annular lamp bulb providing a passageway for reflected radiation, means for supporting said bulb adjacent to and concentric with the mouth of the container, a mosaic screen positioned over and in register with the container, a focusing lens interposed between the screen and the container and arranged to focus radiation transmitted from said inner surface through the said passageway and thereby produce on said screen an image of said surface, a cathode ray tube, means for causing an electron beam supplied by said tube to spirally scan the screen, and means for amplifying a signal produced in the circuit of said beam by a change of voltage in said circuit when the image of a defect in said surface is brought into the path of said beam.

4. The apparatus defined in claim 3, said radiation being of a wave length to which the glass walls of the container are opaque, thereby preventing the transmission of false signals through the walls of the container.

5. The apparatus defined in claim 3, and in combination therewith a picture tube connected to the amplifying means and actuated by the amplified signal and thereby reproducing a picture of said image.

WILLIAM J. FEDORCHAK.

References Cited in the file of this patent

UNITED STATES PATENTS

| Number | Name | Date |
| --- | --- | --- |
| 1,444,400 | Silverman | Feb. 6, 1923 |
| 1,648,058 | Parker | Nov. 8, 1927 |
| 1,897,141 | Peters | Feb. 14, 1933 |
| 2,021,907 | Zworykin | Nov. 26, 1935 |
| 2,184,159 | Stockbarger et al. | Dec. 19, 1939 |
| 2,193,606 | Ulrey | Mar. 12, 1940 |
| 2,247,684 | Hickok | July 1, 1941 |
| 2,454,411 | Stoate | Nov. 23, 1948 |
| 2,481,354 | Schuler | Sept. 6, 1949 |
| 2,481,863 | Owens | Sept. 13, 1949 |
| 2,550,316 | Wilder | Apr. 24, 1951 |

OTHER REFERENCES

Portable Meters for the Measurement of Light and UV Energy, Luckiesch et al.—G. E. Review—April 1941, pp. 217–221.